(12) United States Patent
Higaki

(10) Patent No.: US 6,920,248 B2
(45) Date of Patent: Jul. 19, 2005

(54) CONTOUR DETECTING APPARATUS AND METHOD, AND STORAGE MEDIUM STORING CONTOUR DETECTING PROGRAM

(75) Inventor: Nobuo Higaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 636 days.

(21) Appl. No.: 09/951,540

(22) Filed: Sep. 14, 2001

(65) Prior Publication Data

US 2002/0031265 A1 Mar. 14, 2002

(30) Foreign Application Priority Data

Sep. 14, 2000 (JP) .................... 2000-280686

(51) Int. Cl.[7] .................... G06K 9/48; G06K 9/46
(52) U.S. Cl. .................... 382/199; 382/203
(58) Field of Search .................... 382/171, 173, 382/181, 184, 190, 203, 215, 216, 266, 267, 268, 199, 106, 154

(56) References Cited

U.S. PATENT DOCUMENTS 5,881,170 A * 3/1999 Araki et al. ............ 382/199

6,636,635 B2 * 10/2003 Matsugu ............ 382/218

FOREIGN PATENT DOCUMENTS

JP  8-189809  7/1996
JP  8-329254  12/1996

* cited by examiner

*Primary Examiner*—Amelia M. Au
*Assistant Examiner*—Wesley Tucker
(74) *Attorney, Agent, or Firm*—Birch, Stewart, Kolasch & Birch, LLP

(57) ABSTRACT

A contour detecting apparatus for accurately detecting a contour of a target object without increasing the detection time is disclosed. The apparatus comprises a section for storing a contour model consisting of nodes, which surrounds at least one target object in a captured image and is used for detecting a contour of the target object; a deforming section for contracting or expanding the contour model by shifting the nodes based on a predetermined rule; a section for calculating a distance between two non-adjacent nodes of the contour model which was deformed by the deforming section, and determining that the contour model is to be split when the calculated distance is equal to or smaller than a predetermined threshold; and a section for splitting the contour model according to a result of the above determination, wherein the splitting operation is executed in the vicinity of said non-adjacent nodes.

18 Claims, 8 Drawing Sheets

FIG. 6A

| V | COORDINATE x | COORDINATE y |
|---|---|---|
| $V_1$ | $x_1$ | $y_1$ |
| . . . | . . . | . . . |
| $V_i$ | $x_i$ | $y_i$ |
| $V_{i+1}$ | $x_{i+1}$ | $y_{i+1}$ |
| . . . | . . . | . . . |
| $V_j$ | $x_j$ | $y_j$ |
| $V_{j+1}$ | $x_{j+1}$ | $y_{j+1}$ |
| . . . | . . . | . . . |
| $V_{14}$ | $x_{14}$ | $y_{14}$ |

FIG. 6B

| V | COORDINATE x | COORDINATE y |
|---|---|---|
| $V_1$ | $x_1$ | $y_1$ |
| . . . | . . . | . . . |
| $V_7$ | $x_7$ | $y_7$ |

FIG. 6C

| V | COORDINATE x | COORDINATE y |
|---|---|---|
| $V_1$ | $x_1$ | $y_1$ |
| . . . | . . . | . . . |
| $V_7$ | $x_7$ | $y_7$ |

CONTOUR DETECTING APPARATUS AND METHOD, AND STORAGE MEDIUM STORING CONTOUR DETECTING PROGRAM

BACKGROUND OF THE INVENTION

1. Field of the Invention

The present invention relates to a contour detecting apparatus and method, and a storage medium storing a contour detecting program, for detecting a contour (or outline) of a target object included in an image which is taken by an optical (or visual) sensor such as a camera.

2. Description of the Related Art

In order to detect contours of objects by referring to an image captured by an optical sensor such as a camera, a method using active contour models is known. This contour detecting method has a distinctive feature of using contour line models employing dynamic closed curves called "snakes", thereby detecting contours of objects even if the shapes of the objects temporally change in the images. In the method, an energy function is assigned to the "snake" in consideration of its position and shape, so that the energy decreases to a minimum level when the shape of a target object agrees with that of the "snake". More specifically, the energy function is defined as the sum of internal energy related to the smoothness of the relevant curve, energy related to a difference (or an error) between the curve and the contour of the target object, energy originated when enforcing external constraint, and the like.

In the method, the position and the shape of the "snake" is dynamically adjusted until a specific minimum solution of the energy function is obtained with respect to the contour of a target object included in an image. Accordingly, it is possible to substitute the minimization of the energy (i.e., an optimization process) for the detection of the contour.

The above-explained outline detecting method employing dynamic contour models has limitations or problems such that the number of objects to be detected must be known or a general contour line must be defined, in advance, in the vicinity of the target object. In order to solve these problems, another kind of contour detecting method has been proposed which can be used even if the number of target objects is unknown and which does not require the definition, in advance, of a general contour of the target object as an initial contour. A paper written by S. Araki, "Real-Time Tracking of Multiple Moving Objects Using Split-and-Merge Contour Models Based on Crossing Detection", Vol. J80-D-II, No. 11, Proceedings of the IEICE (Institute of Electronics, Information and Communication Engineers), pp. 2940–2948, 1997, and Japanese Unexamined Patent Application, First Publication No. Hei 8-329254 (corresponding to U.S. Pat. No. 5,881,170) disclose examples of the method.

In the contour detecting process of conventional contour detecting methods, it is necessary to increase the number of points for forming the contour (called "nodes") so as to accurately detect the contour line of the target object. However, the larger the number of nodes, the longer the time necessary for detecting the contour, and accordingly, it is difficult to perform real-time processing. In particular, in a split-determining process for splitting the contour model, determination is performed based on whether two line segments for connecting the nodes contact or intersect each other. In this case, the time necessary for calculating is too long to perform real-time processing.

SUMMARY OF THE INVENTION

In consideration of the above circumstances, an object of the present invention is to provide a contour detecting apparatus and method, and a storage medium storing a contour detecting program, for accurately detecting a contour of a target object without increasing the time necessary for the detection.

Therefore, the present invention provides a contour detecting apparatus comprising:

a contour model storage section for storing a contour model consisting of a plurality of nodes, which surrounds at least one target object included in a captured image and is used for detecting a contour of said target object;

a contour model deforming section for contracting or expanding the contour model by shifting the nodes based on a predetermined rule for deformation;

a split-determining section for calculating a distance between two non-adjacent nodes among the nodes of the contour model which was deformed by the contour model deforming section, and determining that the contour model is to be split when the calculated distance is equal to or smaller than a predetermined threshold value; and a contour model splitting section for splitting the contour model according to a result of the determination executed by the split-determining section, wherein the splitting operation is executed in the vicinity of said two non-adjacent nodes.

The present invention also provides a contour detecting method comprising the steps of:

a contour model deforming step of contracting or expanding a contour model consisting of a plurality of nodes, which surrounds at least one target object included in a captured image and is used for detecting a contour of said target object, by shifting the nodes based on a predetermined rule for deformation;

a split-determining step of calculating a distance between two non-adjacent nodes among the nodes of the contour model which was deformed in the contour model deforming step, and determining that the contour model is to be split when the calculated distance is equal to or smaller than a predetermined threshold value; and a contour model splitting step of splitting the contour model according to a result of the determination executed in the split-determining step, wherein the splitting operation is executed in the vicinity of said two non-adjacent nodes.

The present invention also provides a computer readable storage medium storing a contour detecting program for making a computer execute a contour detecting operation of detecting a contour of at least one target object in a captured image, where the operation comprises the steps included in the above contour detecting method.

According to the above apparatus, method, and operation (i.e., program), even when a plurality of target objects are present in the same image, the contour of the target objects can be reliably detected in a short operation time.

The contour detecting apparatus may further comprise:

a distance image obtaining section for obtaining a distance image corresponding to said captured image by acquiring distance data of each pixel in said captured image, and wherein:

the contour model deforming section deforms the contour model based on the obtained distance image, so as to make the contour model correspond only to said target object which is present in a predetermined distance range; and the split-determining section determines whether the contour model defined in the predetermined distance range is to be split.

Similarly, the contour detecting method or operation may further comprise:

a distance image obtaining step of obtaining a distance image corresponding to said captured image by acquiring distance data of each pixel in said captured image, and wherein:

the contour model deforming step includes deforming the contour model based on the obtained distance image, so as to make the contour model correspond only to said target object which is present in a predetermined distance range; and the split-determining step includes determining whether the contour model defined in the predetermined distance range is to be split.

Accordingly, the objects to be detected can be narrowed down to limited target objects and the target objects can be reliably detected, thereby considerably reducing the operation time.

In the contour detecting apparatus, the split-determining section may calculate the square of the distance between said two non-adjacent nodes and determine that the contour model is to be split when the calculated square of the distance is equal to or smaller than a predetermined threshold value.

Similarly, in the contour detecting method or operation, the split-determining step may include calculating the square of the distance between said two non-adjacent nodes and determining that the contour model is to be split when the calculated square of the distance is equal to or smaller than a predetermined threshold value.

Also in the contour detecting apparatus, the contour model deforming section may deform the contour model in a manner such that an energy function assigned to the contour model has a minimum solution.

Similarly, in the contour detecting method or operation, the contour model deforming step may include deforming the contour model in a manner such that an energy function assigned to the contour model has a minimum solution.

Additionally, in the contour detecting apparatus, method, or operation, when a thinnest portion of said target object is known, the threshold value may be predetermined in consideration of the thickness of the thinnest portion, so as to prevent the contour model from being split at the thinnest portion.

The present invention also provides a contour detecting apparatus, comprising:

a contour model storage section for storing a contour model consisting of a plurality of nodes, which surrounds at least one target object included in a captured image and is used for detecting a contour of said target object;

a contour model deforming section for contracting or expanding the contour model by shifting the nodes based on a predetermined rule for deformation; and a distance image obtaining section for obtaining a distance image corresponding to said captured image by acquiring distance data of each pixel in said captured image, wherein:

the contour model deforming section deforms the contour model based on the obtained distance image, so that the contour of said target object is detected.

The present invention also provides a corresponding contour detecting method, comprising the steps of:

a contour model deforming step of contracting or expanding a contour model consisting of a plurality of nodes, which surrounds at least one target object included in a captured image and is used for detecting a contour of said target object, by shifting the nodes based on a predetermined rule for deformation; and a distance image obtaining step of obtaining a distance image corresponding to said captured image by acquiring distance data of each pixel in said captured image, wherein:

the contour model deforming step includes deforming the contour model based on the obtained distance image, so that the contour of said target object is detected.

The present invention also provides a computer readable storage medium storing a corresponding contour detecting program for making a computer execute a contour detecting operation of detecting a contour of at least one target object in a captured image, where the operation comprises the steps included in the above contour detecting method.

According to the above apparatus, method, and operation (i.e., program), the deformation of the contour model can be efficiently performed, and as a result, the accuracy of detecting the contour can be improved.

BRIEF DESCRIPTION OF THE DRAWINGS

FIG. 6A shows a table structure of the contour model storage section 5 which stores the contour model before the splitting operation, and FIGS. 6B and 6C show table structures of the contour model storage section 5 which stores the contour models after the splitting operation.

DESCRIPTION OF THE PREFERRED EMBODIMENTS

Hereinafter, a contour detecting apparatus as an embodiment according to the present invention will be explained in detail with reference to the drawings.

Figure 1:
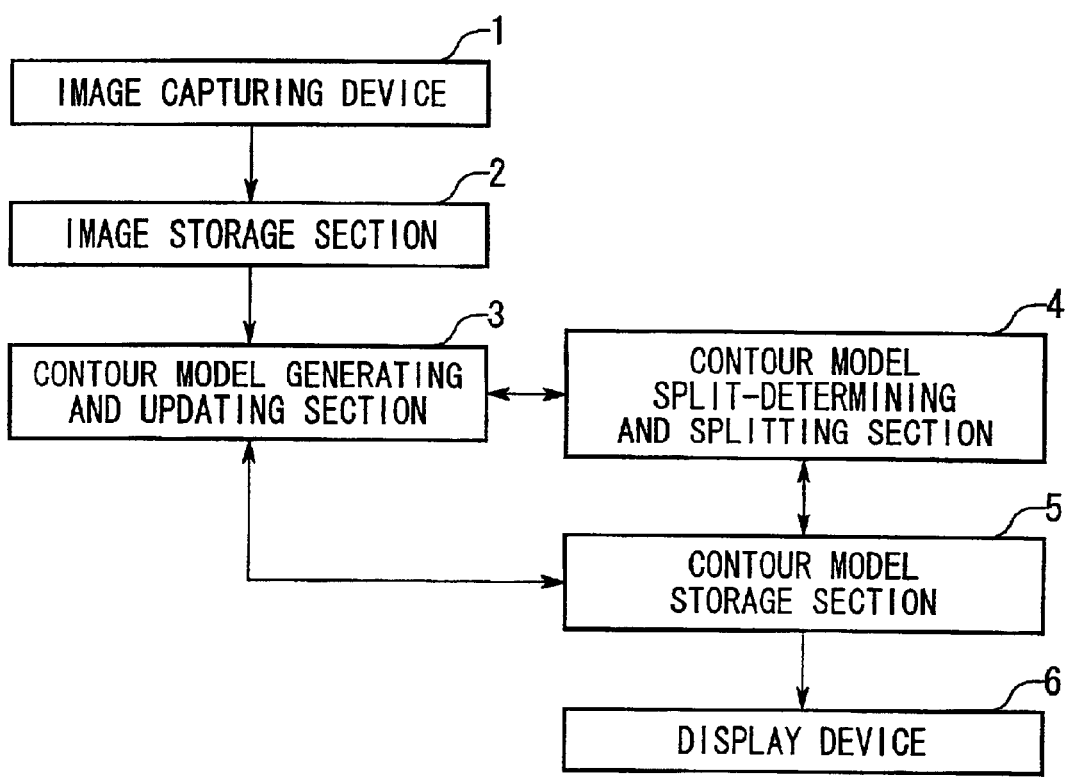
FIG. 1 is a block diagram showing the structure of a contour detecting apparatus as an embodiment according to the present invention.

FIG. 1 is a block, diagram showing the structure of the present embodiment. In the figure, reference numeral 1 is an image capturing device employing a CCD camera, infrared camera, or the like. Reference numeral 2 indicates an image storage section for storing images captured by the image capturing device 1. Reference numeral 3 indicates a contour model generating and updating section for generating and updating a contour model based on image data stored in the image storage section 2. Reference numeral 4 indicates a contour model split-determining and splitting section for determining whether the contour model is to be split based on the data of the contour model generated or updated by the contour model generating and updating section 3, and for splitting the contour model according to the determined result. That is, the determination of the split is performed in advance so as to split the contour model. Reference numeral 5 indicates a contour model storage section for storing the contour model resulting from the operation performed by the contour model split-determining and splitting section 4. Reference numeral 6 indicates a display device employing a CRT or the like for displaying the contour of a target object included in a captured image.

Figure 2:
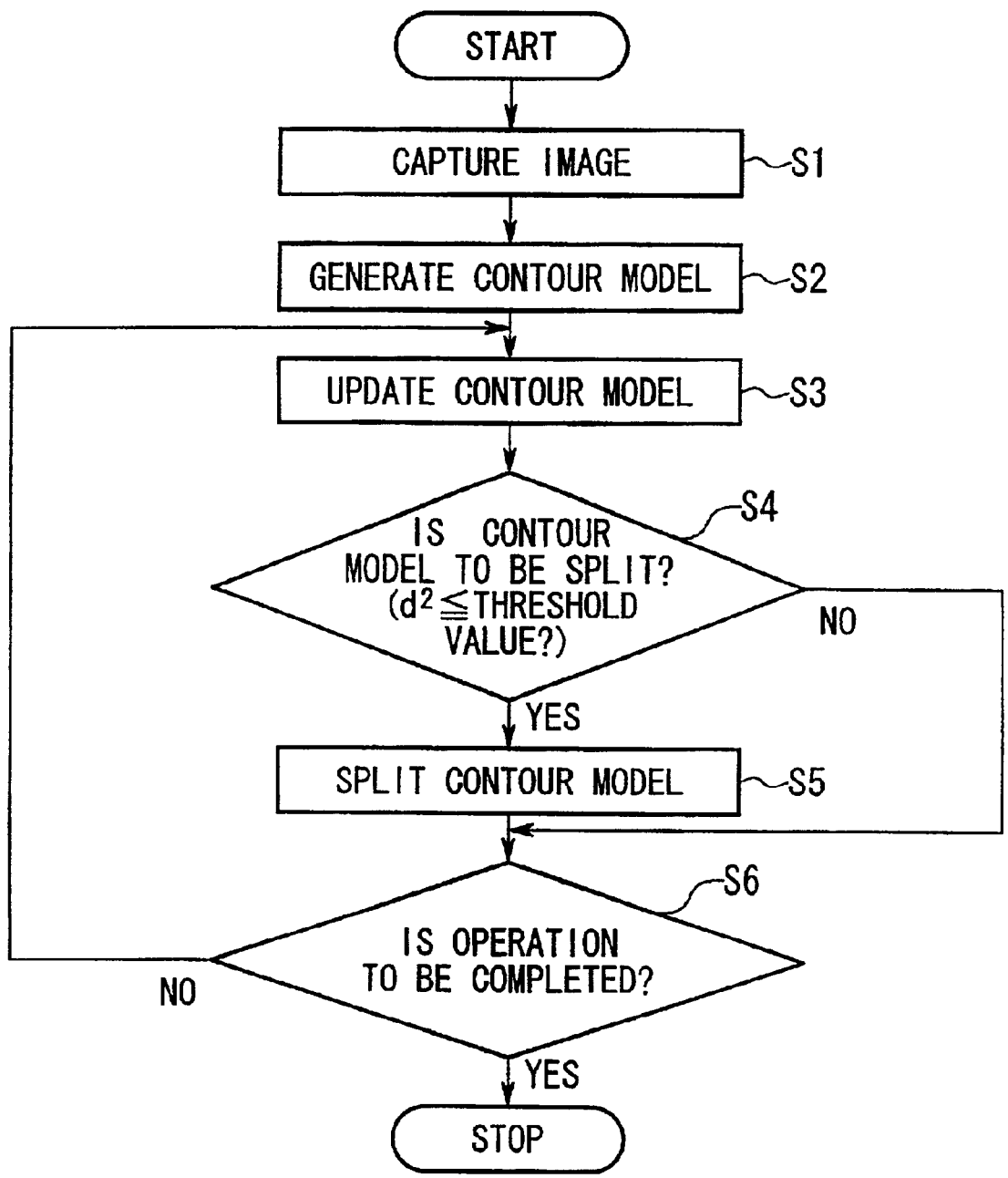
FIG. 2 is a flowchart showing the operation of the contour detecting apparatus shown in FIG. 1.

Below, with reference to FIG. 2, the operation of the contour detecting apparatus as shown in FIG. 1 will be explained. FIG. 2 is a flowchart showing this operation.

In the first step S1, an image of a target object is captured by the image capturing device 1, and the image capturing device 1 converts the captured image into a digital image and stores the digital image data in the image storage section 2. Here, each digital value of the image data stored in the image storage section 2 is obtained by converting the brightness level of each pixel to a digital value. If 8-bit data representation is employed, a brightness value from 0 to 255, assigned to each pixel, is stored.

In the next step S2, the contour model generating and updating section 3 generates a contour model by using the image data stored in the image storage section 2, and stores the generated contour model in the contour model storage section 5. This generation of the contour model is performed using a known generating method. For example, points are arranged on a contour in a manner such that each side of a rectangle whose size is the same as that of the captured image is equally divided by the positions of the points into a specific number of portions, and these points are stored as nodes (which constitute the contour) in the contour model storage section 5.

If temporally-successive images are processed, a rectangle which includes a contour detected by the previous image may be used. That is, a contour model can be generated based on the previous image (i.e., the image detected immediately before the current operation), thereby simplifying the process of defining nodes for constituting the contour.

In the following step S3, the contour model generating and updating section 3 updates the contour model in a manner such that the energy function of the contour model has a minimum solution by adjusting the nodes stored in the contour model storage section 5. This updating operation is also performed based on a known method.

The energy function employed here may use one of (i) spline terms suitable for smoothing the contour, (ii) area terms acting so as to contract the contour, (iii) inter-node distance terms for equalizing the intervals between the nodes, and (iv) edge terms acting so as to draw each node towards an edge of the image. After one of the nodes is shifted so as to have a minimum solution of the energy function, if the distance between the shifted node and its adjacent node is equal to or smaller than a predetermined value, a process of canceling this shifted node is performed. At this stage, a contour model, which has been updated so as to have a minimum solution of the predetermined energy function, is stored in the contour model storage section 5.

In the next step S4, the contour model split-determining and splitting section 4 determines whether the contour model stored in the contour model storage section 5 is to be split. This determination is performed based on whether the square of the distance between two nodes which are non-adjacently defined in the image is equal to or smaller than a predetermined threshold value. When the square of the distance between the two nodes is smaller than the predetermined threshold value, a splitting operation is performed on the contour model (see step S5).

Figure 5A:
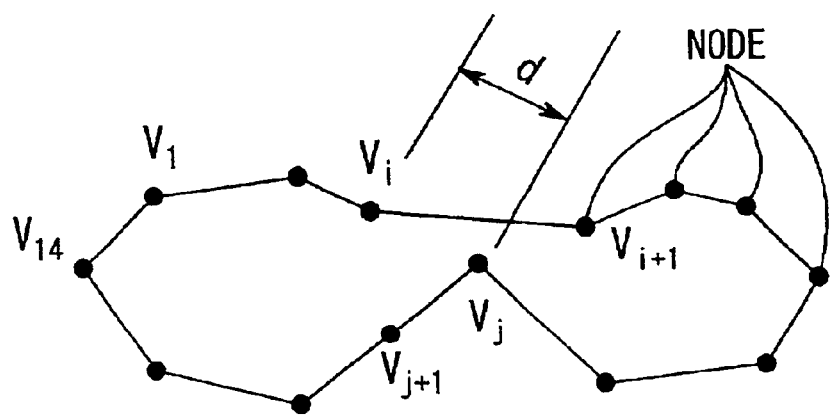
FIG. 5A is a diagram showing an example of the contour model before the splitting operation.
Figure 5B:
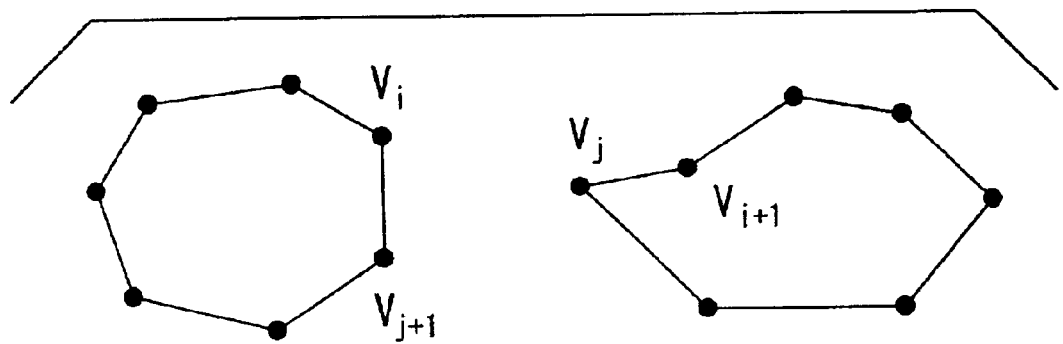
FIG. 5B is a diagram showing an example of the contour model after the splitting operation.

The split-determining and splitting operation will be explained with reference to FIGS. 5A to 6C which show a concrete example. FIGS. 5A and 5B respectively show examples of the contour model before and after the splitting operation. FIG. 6A shows a table structure of the contour model storage section 5 which stores the contour model before the splitting operation, and FIGS. 6B and 6C show table structures of the contour model storage section 5 which stores the contour models after the splitting operation. Here, each node is shown by $V_i$ $(x_i, y_i)$ $(i=1, 2, \ldots, n)$.

The contour model shown in FIG. 5A consists of 14 nodes, and sequence numbers from 1 to 14 are respectively assigned to these nodes. In an example of the assignment of each sequence number, among the nodes constituting the contour, the node which has coordinate values closest to the origin is assigned the sequence number "1", and the following sequence numbers are assigned clockwise to the following (i.e., adjacent) nodes. Based on the sequence numbers, coordinate values of each node are stored in the contour model storage section 5, as shown in FIG. 6A.

Below, the split-determining operation will be explained. First, the contour model split-determining and splitting section 4 calculates the square of the distance d between (i) the node having a sequence number of "1" and (ii) a node (here, $V_3$) which is not adjacent to the node of sequence number "1" by using the following formula:

$$d^2 = (x_i - x_j)^2 + (y_i - y_j)^2 \tag{1}$$

where $j \neq i-1, i+1$. In the current example, $i=1$ and $j=3$.

Immediately after the square of the distance between the above two nodes (i.e., $d^2$) is calculated, the contour model split-determining and splitting section 4 compares $d^2$ with a predetermined threshold value. If $d^2$ is equal to or smaller than the threshold value, it is determined that the relevant contour model is to be split.

On the other hand, if $d^2$ is not equal to or smaller than the threshold value, then j in formula (1) is gradually changed from 4 to 13 by 1, and every time j is changed, the operation of comparing the calculated $d^2$ with the threshold value is executed so as to determine whether the contour model is to be split.

If it is not determined that the contour model is to be split even after the value of j is changed up to 13, then the contour model split-determining and splitting section 4 further changes the value of i in formula (1) from 2 to 14 by 1, and a similar determining operation is repeated again. According to the determining operation, the square of the distance between each target node and each non-adjacent node of the target node is calculated. Based on the calculated results, the split-determining operation is performed.

In the above split-determining operation, the value compared with the threshold value is the square of the distance, that is, $d^2$. However, the distance d between two nodes may be used in the comparison. The object of employing $d^2$ in the above example is to omit an operation of calculating the square root, where this calculation is necessary for calculating the distance d. Even when the square of the distance is employed, effects similar to those obtained by employing the distance d can be obtained by providing a threshold value suitable for the square of the distance (i.e., $d^2$).

Next, the splitting operation will be explained. First, if the square of the distance $d^2$ calculated by formula (1) is equal to or smaller than the threshold value, then the splitting operation is executed based on the nodes $V_i$ and $V_j$ which were used in the calculation of the square of the distance $d^2$. For example, when the square of the distance between node $V_i$ and node $V_j$ shown in FIG. 5A (in which "d" denotes the distance) is equal to or smaller than the threshold value, nodes $V_i$ and $V_{j+1}$ are connected to each other, and nodes $V_{i+1}$ and $V_j$ are also connected to each other, so that the contour model shown in FIG. 5A is split into two newly generated contour models as shown in FIG. 5B. The contour model split-determining and splitting section 4 stores data of these two contour models in the contour model storage section 5 (see FIGS. 6B and 6C). Accordingly, the former contour model consisting of 14 nodes has been divided into two contour models, each consisting of 7 nodes.

As explained above, the split-determining operation is performed only based on the calculation of the square of the distance between two nodes (or the distance itself) and the operation of comparing the calculated result with a threshold value; thus, in comparison with the conventional split-determining operation of referring to a contacting or intersecting state between two line segments for connecting the nodes, the processing time can be reduced. Therefore, it is possible to increase the number of nodes constituting a relevant contour model, thereby improving the accuracy of the shape of the detected contour of the target object.

In the final step S6 in FIG. 2, the contour model split-determining and splitting section 4 determines whether the current operation is to be completed. This determination is performed based on whether the operation from step S3 to step S5 in FIG. 2 has been repeated a predetermined number of times. As an example of the predetermined number of times, the size of the obtained image, that is, the width or height, may be designated. Here, even if the operation has not been repeated a predetermined number of times, if no portion of the contour model remains, it is determined that the operation is to be completed.

If it is not determined that the operation is to be completed, the contour model split-determining and splitting section 4 commands the contour model generating and updating section 3 to update the contour model again. Accordingly, the operation from step S3 to step S5 in FIG. 2 is executed again.

When it is determined in step 6 that the operation is to be completed, the display device 6 retrieves and displays the contour model stored in the contour model storage section 5.

The contour detecting apparatus repeats the above-explained operation shown in FIG. 2 for temporally successive images, and accordingly, the detected contour is displayed on the display device 6.

Figure 3:
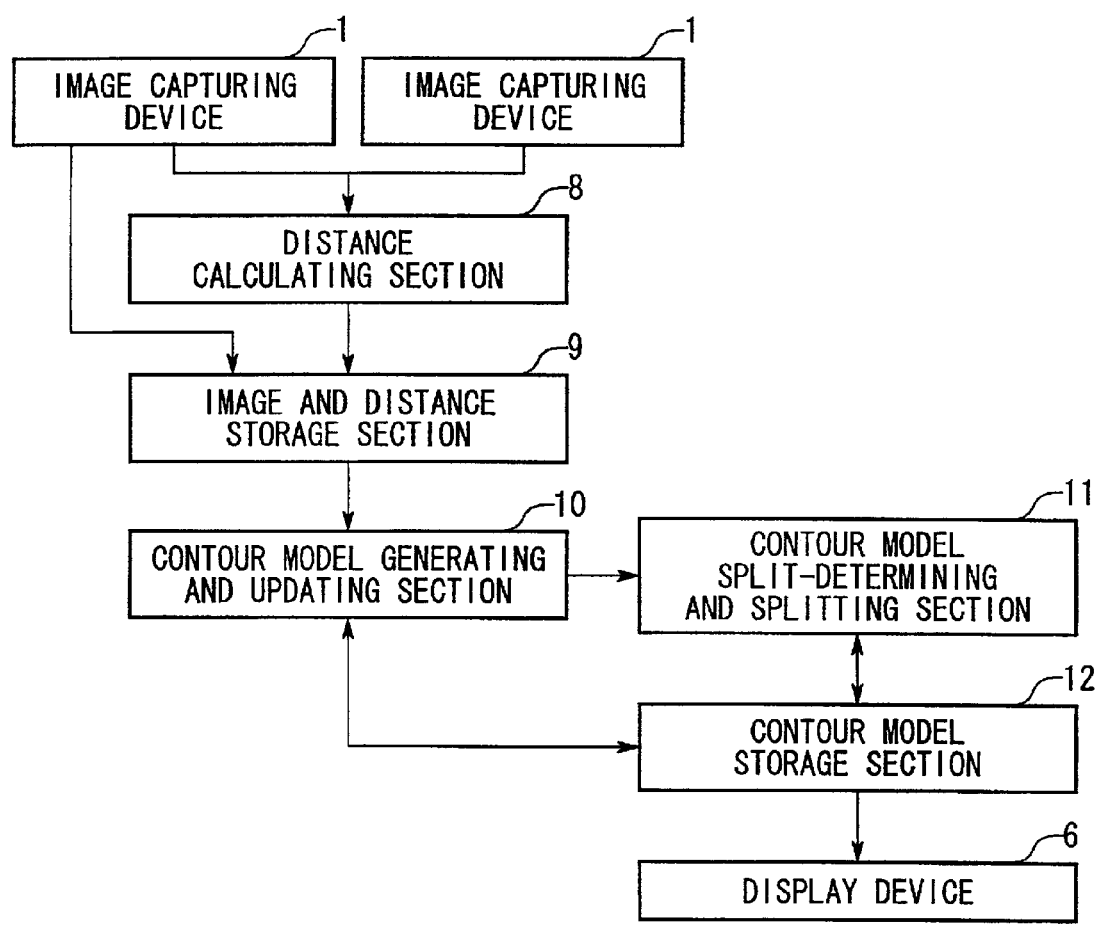
FIG. 3 is a block diagram showing the structure of a contour detecting apparatus as another embodiment according to the present invention.

Below, another embodiment will be explained with reference to FIG. 3. In FIG. 3, parts identical to those in FIG. 1 are given identical reference numerals, and explanations thereof are omitted.

In FIG. 3, reference numeral 8 indicates a distance calculating section for calculating the distance assigned to each pixel by referring to two images captured by two image capturing devices 1. Reference numeral 9 indicates an image and distance storage section for storing (i) one of the images captured by the two image capturing devices 1 and (ii) a distance image obtained based on calculated results output from the distance calculating section 8. Reference numeral 10 indicates a contour model generating and updating section for generating or updating a contour model based on image data and distance image data stored in the image and distance storage section 9. Reference numeral 11 indicates a contour model split-determining and splitting section for determining whether the current contour model is to be split and for splitting the contour model based on the determined result. Reference numeral 12 indicates a contour model storage section for storing the contour model resulting from the operation performed by the contour model split-determining and splitting section 11. In this embodiment, two image capturing devices 1 are provided so as to obtain a distance image based on the images captured by these image capturing devices.

Figure 4:
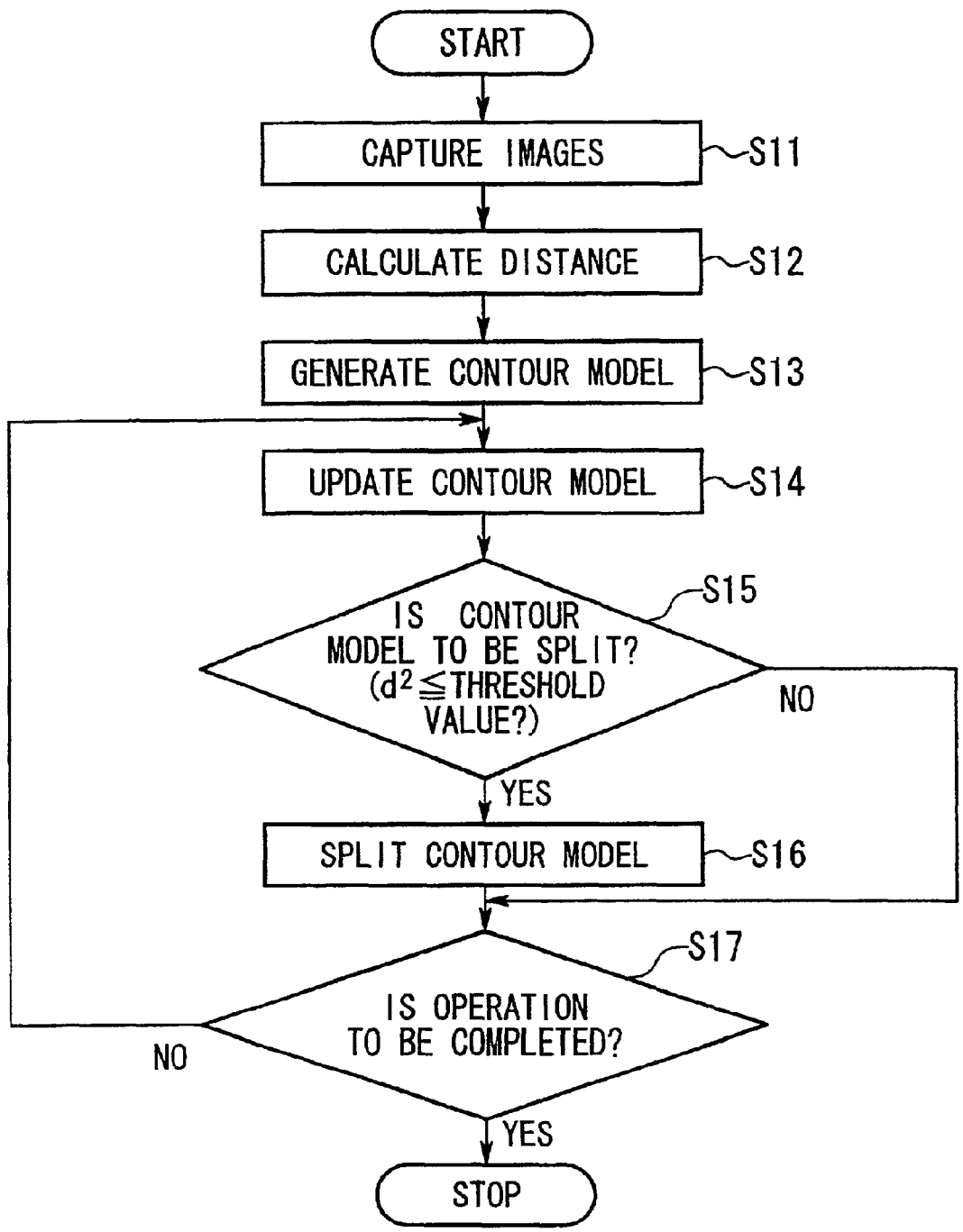
FIG. 4 is a flowchart showing the operation of the contour detecting apparatus shown in FIG. 3.

Below, the operation of the contour detecting apparatus shown in FIG. 3 will be explained with reference to FIG. 4. FIG. 4 is a flowchart showing this operation. In the following explanations, the functions different from those of the contour detecting apparatus explained with reference to FIGS. 1 and 2 will be mainly explained, and explanations of basically the same functions are omitted here.

In the first step S11, the two image capturing devices 1 simultaneously take images of a target object, and each image capturing device converts the captured image into a digital image and outputs it to the distance calculating section 8. In addition, one of the two images is stored in the image and distance storage section 9.

In the next step S12, the distance calculating section 8 calculates the distance of each pixel, generates a distance image based on calculated results, and stores the distance image in the image and distance storing section 9. That is, at this stage, the image captured by an image capturing device 1 and the distance image corresponding to this image are stored in the image and distance storing section 9.

In the following step S13, the contour model generating and updating section 10 generates a contour model based on the image data stored in the image and distance storing section 9, and stores data of the generated contour model in the contour model storage section 12.

In the following step S14, the contour model generating and updating section 10 updates the positions of the nodes which constitute the contour model stored in the contour model storage section 12, so as to obtain a minimum solution of an energy function assigned to the contour model. The energy function employed here uses edge terms using distance data, in addition to one of the above-explained spline terms, area terms, inter-node distance terms, and edge terms. This condition is satisfied by referring to the distance image and setting the energy weight coefficient (i.e., the edge term) assigned to each pixel which is not included within a desired distance range (for detecting the contour of the target object) to zero. Accordingly, the contour model is concentrated to edges which are present within the desired distance range, and as a result, objects which are not present within the desired distance range are not targeted in the contour detecting operation.

Figure 7:
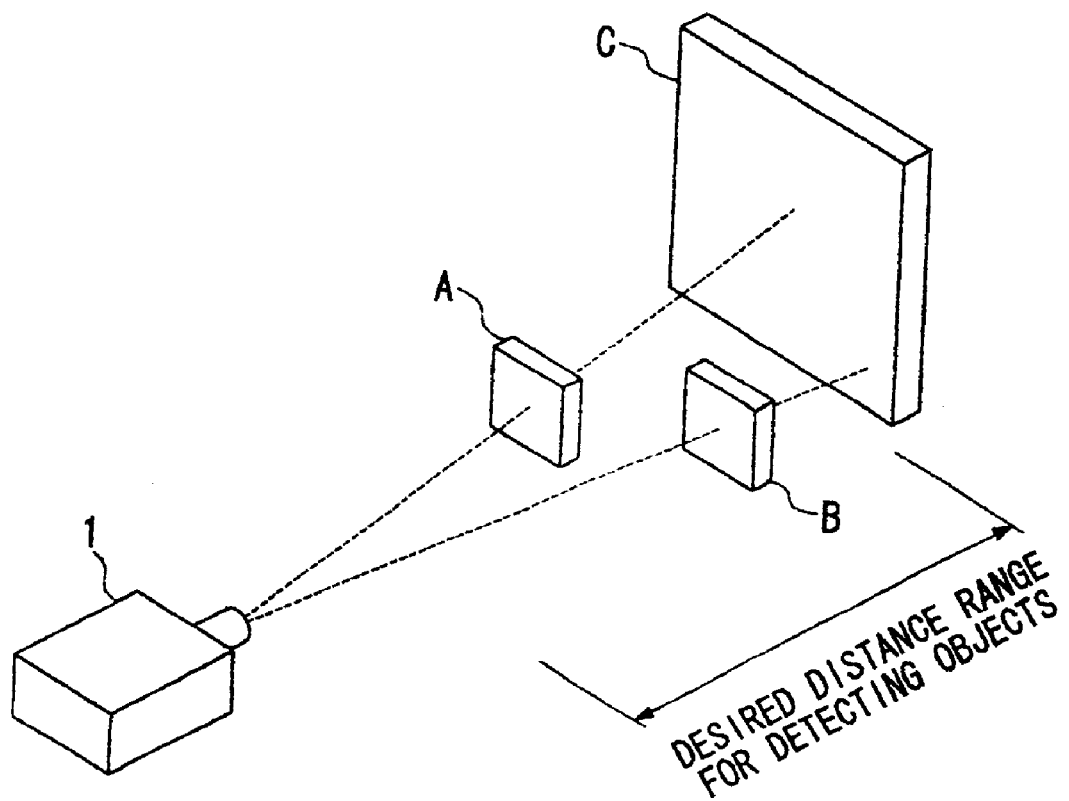
FIG. 7 is a diagram for explaining the contour detecting operation employing a distance image.
Figure 8A:
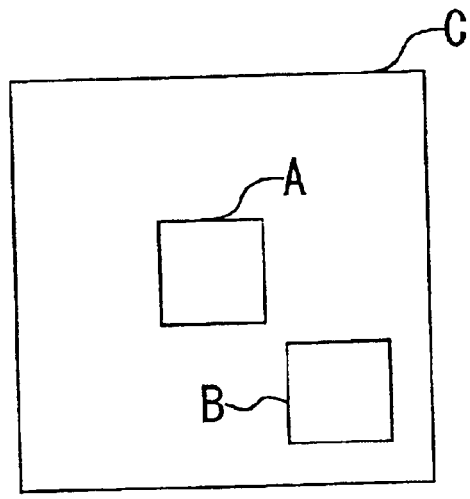
FIGS. 8A and 8B are diagrams for explaining the contour detecting operation employing a distance image.

Such an operation is effective, for example, in a situation shown by FIG. 7. That is, if objects A, B, and C are present within the visual field of the image capturing device 1, then in the obtained image, the objects A and B are present inside the object C, as shown in FIG. 8A. In the contour detecting operation subjected to this image, the processes for detecting contours of the objects A and B are complicated.

Figure 8B:
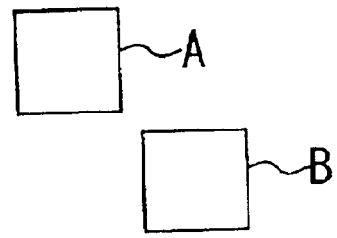

However, if two image capturing devices 1 are used for obtaining a distance image of the scene shown in FIG. 7, and a desired distance range for detecting objects is predetermined so as not to target objects which are not present in this range, then the contour detecting operation is equivalent to a contour detecting operation using an image only including objects A and B (see FIG. 8B), so that the contour can be reliably detected.

Immediately after the execution of step S14, data of a contour model of each target object which is present in a desired distance range, having a minimum solution of a predetermined energy function, is stored in the contour model storage section 12.

The contour model split-determining and splitting section 11 then determines whether the contour model stored in the contour model storage section 12 is to be split (see step S15), and executes the splitting operation based on the determined result (see step S16). These split-determining and splitting operations are similar to those explained above.

In the final step S17, the contour model split-determining and splitting section 11 determines whether the current operation is to be completed. If it is determined that the current operation is to be completed, then the display device 6 retrieves the data of the contour model stored in the contour model storage section 12 and displays the contour model.

The present contour detecting apparatus repeatedly executes the operation shown in FIG. 4 for temporally successive images.

As explained above, in the operation of splitting the contour model, by referring to a distance image, objects which are not present in a desired distance range are not targeted, thereby further reducing the operation time. In addition, even if target objects overlap with each other, the contour of the objects can be reliably detected.

In the split-determining step S4 in FIG. 2 or S15 in FIG. 4, in addition to the result of comparing the square of the distance $d^2$ with the threshold value, an additional determination may be performed, that is, it may be further determined whether the contour model should be split based on the results of the above comparison. In this case, according to the results of the additional determination of validity, the splitting operation (see step S5 or S16) is executed.

This determination of validity is performed based on an assumption that the contour model would be split into two models, and in the determination, parameters inside each area surrounded by nodes of each contour model are compared. Here, the following parameters can be used: average brightness in the area, color distribution (if color images are used), temperature distribution (if infrared images are used), distance to objects for constituting two contour models, three-dimensional positions of the objects, and the like. At least one of these parameters is used for the above comparison.

For example, after it is determined that the contour model is to be split based on the results of the comparison of the square of the distance ($d^2$) with the threshold value, it is assumed that the target contour model would be split into two models and an assumed splitting operation is performed. Then, average brightness values of two contour models obtained by the assumed splitting operation are calculated, and if the difference between the two average brightness values is larger than a predetermined threshold value, then it is determined that the contour model is to be actually split, while if the difference is equal to or smaller than the threshold value, the split operation is not actually performed because the two assumed objects are probably the same.

Based on the determined results, the threshold value to be compared with the square of the distance (i.e., $d^2$) is revised. More specifically, if the split of the contour model is determined based on the results of the comparison between $d^2$ and the threshold value and further determined based on the results of the determination of the validity, then the threshold value to be compared with $d^2$ is increased so as to increase the probability of executing the splitting operation, while if it is determined that the splitting is not performed based on the validity determination, then the threshold value to be compared with $d^2$ is decreased so as to decrease the above probability. Accordingly, the determining operation can be efficiently performed.

On the other hand, in an example of comparing color distributions, brightness values with respect to three elementary colors (i.e., RGB) are obtained for each pixel, and each brightness difference between the brightness values assigned to different elementary colors is compared with a threshold value.

This method of using color data can be effectively applied to the extraction of a face part among the entire body of a human, for example. In a concrete example, an average value of color data of each of divided contour models is first calculated, and if one of the average values is close to a predetermined skin (or flesh) color and the other corresponds to another color different from the skin color, then the contour model is split so as to extract the portion having the skin color. In an example method of determining the skin color, the RGB colors of each pixel are converted into HLS (hue-lightness-saturation) values, and it is determined that the target portion has the skin color when each average of the HLS values in the relevant contour is within the following ranges: H, 0 to 30; L, 0.2 to 0.5; and S, 0.1 to 0.4.

In an example of comparing temperature distributions, two average temperature values of two areas are calculated, and the determination of validity is performed based on whether the difference between the two average temperature values is larger than a predetermined threshold value.

This method of using temperature distributions can be effectively applied to the extraction of only human(s) among existing targets, for example. In a concrete example, temperature values of each assumedly split contour model are calculated, and if one of the temperature values corresponds to a predetermined average human bodytemperature, and the other does not indicate such a human bodytemperature, then the contour model is actually split. Typically, an average human body temperature is 35 to 37° C.

In an example of using the distance to the object or the position of the object, if two assumed contour models are closely arranged (i.e., the positions are near each other), then the objects corresponding to the two models are regarded as the same object, and the splitting operation is not executed.

In the above determining operation employing a comparison of the parameters, only nodes may be targeted instead of targeting the area surrounded by the nodes, so as to simplify the operation. In this case, the burden on the operation can be reduced, thereby realizing high-speed processing.

As explained above, when validity determination is further performed in the determination of the splitting operation, the accuracy of the split determination can be improved. In addition, the threshold value referred to in the split determination is increased or decreased dynamically according to the determined result; thus, the threshold value can be automatically defined in consideration of the state of the target object for the contour detection. Additionally, the split determination is performed only by calculating the square of the distance (or just the distance) between two nodes and comparing the calculated result with a threshold value. Therefore, in comparison with the above-explained conventional operation of determining whether a contacting or intersecting state is present, the time necessary for the split-determining operation can be reduced. Therefore, even if the above validity determination is additionally performed, the operation time is still sufficiently shorter than the conventional operation time.

The predetermined threshold value may be an empirical value; however, a quantitatively determined value suitable to the target object may be used.

For example, when contour detection employing a distance image is performed, the distance to a target object can be estimated by referring to an average distance of points included in an assumed contour, or the like. Therefore, if a necessary camera parameter is known, the distance between relevant nodes in real space can be calculated. If a target object is a human, the thickness of a wrist, which is a relatively thin part among human body parts, may be the threshold value, thereby preventing the relevant contour model from being split at the position of the wrist. In addition, if a target object is only a hand, the thickness of a finger may be the threshold value, thereby preventing the relevant contour model from being split at the position of the finger.

As explained above, when a feature of the target object is known, the contour of the target object can be accurately detected by suitably setting a threshold value, for example, to the thickness of the thinnest part of the target object. Typically, the threshold value corresponding to the thickness of the wrist of a human is 5 cm, and the threshold value corresponding to the thickness of the finger of a human is 2 cm.

In addition, a program for making a computer execute the operation as shown in FIG. 2 or 4 may be stored in a computer readable storage medium, and this stored program may be loaded onto a computer system, so as to execute the contour detecting operation. Here, the computer system includes hardware resources such as an OS or peripheral devices. When employing a WWW system, the computer system can provide a homepage service (or display) environment. The computer readable storage medium may be a portable medium such as a floppy disk, magneto-optic disk, ROM, CD-ROM, and the like, or a storage device built in the computer system, such as a hard disk. Furthermore, the computer readable storage medium may be a memory which temporarily stores the program, such as a network (typically, the Internet), a server of a communication system for transmitting the program via a communication line (typically, a telephone line), or a volatile memory (i.e., RAM) inside the computer system, which functions as a client of such a communication system.

The above program may be transmitted from the computer system (which stores this program in a storage device or the like) to another computer system, via a transmitting medium or waves transmitted through a transmitting medium. The transmitting medium for transmitting the program is a medium having a function of transmitting data, such as a communication network (typically, the Internet) or a communication line (typically, a telephone line). In addition, a program for performing a portion of the above-explained functions may be used. Furthermore, a differential file (i.e., a differential program) to be combined with a program which has already been stored in the computer system may be provided for realizing the above functions.

As explained above, the present invention can be effectively applied to a system for controlling devices based on data which is optically obtained, such as a safety support system of vehicles or a visual system of an intelligent robot.

What is claimed is:

1. A contour detecting apparatus comprising:
   a contour model storage section for storing a contour model consisting of a plurality of nodes, which surrounds at least one target object included in a captured image and is used for detecting a contour of said target object;
   a contour model deforming section for contracting or expanding the contour model by shifting the nodes based on a predetermined rule for deformation;
   a split-determining section for calculating a distance between two non-adjacent nodes among the nodes of the contour model which was deformed by the contour model deforming section, and determining that the contour model is to be split when the calculated distance is equal to or smaller than a predetermined threshold value; and
   a contour model splitting section for splitting the contour model according to a result of the determination executed by the split-determining section, wherein the splitting operation is executed in the vicinity of said two non-adjacent nodes.

2. The contour detecting apparatus as claimed in claim 1, further comprising:
   a distance image obtaining section for obtaining a distance image corresponding to said captured image by acquiring distance data of each pixel in said captured image, and wherein:
   the contour model deforming section deforms the contour model based on the obtained distance image, so as to make the contour model correspond only to said target object which is present in a predetermined distance range; and
   the split-determining section determines whether the contour model defined in the predetermined distance range is to be split.

3. The contour detecting apparatus as claimed in claim 1, wherein the split-determining section calculates the square of the distance between said two non-adjacent nodes and determines that the contour model is to be split when the calculated square of the distance is equal to or smaller than the predetermined threshold value.

4. The contour detecting apparatus as claimed in claim 1, wherein the contour model deforming section deforms the contour model in a manner such that an energy function assigned to the contour model has a minimum solution.

5. The contour detecting apparatus as claimed in claim 1, wherein when a thinnest portion of said target object is known, the threshold value is predetermined in consideration of the thickness of the thinnest portion, so as to prevent the contour model from being split at the thinnest portion.

6. A contour detecting apparatus, comprising:
   a contour model storage section for storing a contour model consisting of a plurality of nodes, which surrounds at least one target object included in a captured image and is used for detecting a contour of said target object;
   a contour model deforming section for contracting or expanding the contour model by shifting the nodes based on a predetermined rule for deformation;
   a split-determining section for calculating a distance between two non-adjacent nodes among the nodes of the contour model which was deformed by the contour model deforming section, and determining that the contour model is to be split when the calculated distance is equal to or smaller than a predetermined threshold value; and
   a distance image obtaining section for obtaining a distance image corresponding to said captured image by acquiring distance data of each pixel in said captured image, wherein:
   the contour model deforming section deforms the contour model based on the obtained distance image, so that the contour of said target object is detected.

7. A contour detecting method comprising the steps of:
   a contour model deforming step of contracting or expanding a contour model consisting of a plurality of nodes, which surrounds at least one target object included in a captured image and is used for detecting a contour of said target object, by shifting the nodes based on a predetermined rule for deformation;

a split-determining step of calculating a distance between two non-adjacent nodes among the nodes of the contour model which was deformed in the contour model deforming step, and determining that the contour model is to be split when the calculated distance is equal to or smaller than a predetermined threshold value; and a contour model splitting step of splitting the contour model according to a result of the determination executed in the split-determining step, wherein the splitting operation is executed in the vicinity of said two non-adjacent nodes.

8. The contour detecting method as claimed in claim 7, further comprising:

a distance image obtaining step of obtaining a distance image corresponding to said captured image by acquiring distance data of each pixel in said captured image, and wherein:

the contour model deforming step includes deforming the contour model based on the obtained distance image, so as to make the contour model correspond only to said target object which is present in a predetermined distance range; and the split-determining step includes determining whether the contour model defined in the predetermined distance range is to be split.

9. The contour detecting method as claimed in claim 7, wherein the split-determining step includes calculating the square of the distance between said two non-adjacent nodes and determining that the contour model is to be split when the calculated square of the distance is equal to or smaller than the predetermined threshold value.

10. The contour detecting method as claimed in claim 7, wherein the contour model deforming step includes deforming the contour model in a manner such that an energy function assigned to the contour model has a minimum solution.

11. The contour detecting method as claimed in claim 7, wherein when a thinnest portion of said target object is known, the threshold value is predetermined in consideration of the thickness of the thinnest portion, so as to prevent the contour model from being split at the thinnest portion.

12. A contour detecting method, comprising the steps of:

a contour model deforming step of contracting or expanding a contour model consisting of a plurality of nodes, which surrounds at least one target object included in a captured image and is used for detecting a contour of said target object, by shifting the nodes based on a predetermined rule for deformation;

a calculating step for calculating a distance between two non-adjacent nodes among the nodes of the contour model;

a determining step for determining that the contour model is to be split when the calculated distance is equal to or smaller than a predetermined threshold value; and a distance image obtaining step of obtaining a distance image corresponding to said captured image by acquiring distance data of each pixel in said captured image, wherein:

the contour model deforming step includes deforming the contour model based on the obtained distance image, so that the contour of said target object is detected.

13. A computer readable storage medium storing a contour detecting program for making a computer execute an operation of detecting a contour of at least one target object in a captured image, the operation comprising:

a contour model deforming step of contracting or expanding a contour model consisting of a plurality of nodes, which surrounds at least one target object included in a captured image and is used for detecting a contour of said target object, by shifting the nodes based on a predetermined rule for deformation;

a split-determining step of calculating a distance between two non-adjacent nodes among the nodes of the contour model which was deformed in the contour model deforming step, and determining that the contour model is to be split when the calculated distance is equal to or smaller than a predetermined threshold value; and a contour model splitting step of splitting the contour model according to a result of the determination executed in the split-determining step, wherein the splitting operation is executed in the vicinity of said two non-adjacent nodes.

14. The computer readable storage medium as claimed in claim 13, wherein the operation further comprises:

a distance image obtaining step of obtaining a distance image corresponding to said captured image by acquiring distance data of each pixel in said captured image, and wherein:

the contour model deforming step includes deforming the contour model based on the obtained distance image, so as to make the contour model correspond only to said target object which is present in a predetermined distance range; and the split-determining step includes determining whether the contour model defined in the predetermined distance range is to be split.

15. The computer readable storage medium as claimed in claim 13, wherein the split-determining step includes calculating the square of the distance between said two non-adjacent nodes and determining that the contour model is to be split when the calculated square of the distance is equal to or smaller than the predetermined threshold value.

16. The computer readable storage medium as claimed in claim 13, wherein the contour model deforming step includes deforming the contour model in a manner such that an energy function assigned to the contour model has a minimum solution.

17. The computer readable storage medium as claimed in claim 13, wherein when a thinnest portion of said target object is known, the threshold value is predetermined in consideration of the thickness of the thinnest portion, so as to prevent the contour model from being split at the thinnest portion.

18. A computer readable storage medium storing a contour detecting program for making a computer execute an operation of detecting a contour of at least one target object in a captured image, the operation comprising:

a contour model deforming step of contracting or expanding a contour model consisting of a plurality of nodes, which surrounds at least one target object included in a captured image and is used for detecting a contour of said target object, by shifting the nodes based on a predetermined rule for deformation;

a calculating step for calculating a distance between two non-adjacent nodes among the nodes of the contour model;

a determining step for determining that the contour model is to be split when the calculated distance is equal to or smaller than a predetermined threshold value; and a distance image obtaining step of obtaining a distance image corresponding to said captured image by acquiring distance data of each pixel in said captured image, wherein:

the contour model deforming step includes deforming the contour model based on the obtained distance image, so that the contour of said target object is detected.

* * * * *